United States Patent [19]
Schröder

[11] Patent Number: 5,308,050
[45] Date of Patent: May 3, 1994

[54] MOUNTING SYSTEM FOR MACHINE TOOLS AND THE LIKE

[75] Inventor: Harald Schröder, Lüdenscheid, Fed. Rep. of Germany

[73] Assignee: Hasco-Normalien Hasenclever GmbH & Co., Ludenscheid, Fed. Rep. of Germany

[21] Appl. No.: 990,623

[22] Filed: Nov. 24, 1992

[30] Foreign Application Priority Data

Nov. 30, 1991 [DE] Fed. Rep. of Germany ....... 4139522

[51] Int. Cl.$^5$ .............................................. B23Q 3/00
[52] U.S. Cl. .................................... 269/309; 269/900
[58] Field of Search ....................... 269/900, 309–310, 269/20; 29/464

[56] References Cited

U.S. PATENT DOCUMENTS

| | | | |
|---|---|---|---|
| 4,184,669 | 1/1980 | Bald | 269/309 |
| 4,310,963 | 1/1982 | Blumle | 269/900 |
| 4,429,862 | 2/1984 | Niedecker | 269/309 |
| 5,005,814 | 4/1991 | Gumbert | 269/309 |

FOREIGN PATENT DOCUMENTS

| | | |
|---|---|---|
| 3802987 | 1/1989 | Fed. Rep. of Germany . |
| 4038969 | 8/1991 | Fed. Rep. of Germany . |
| 4034340 | 5/1992 | Fed. Rep. of Germany . |
| 2000250 | 1/1969 | France . |
| 1217741 | 12/1970 | United Kingdom . |
| 1238521 | 7/1971 | United Kingdom ................ 269/309 |

OTHER PUBLICATIONS

Catalog "norm+technik Vorrichtungssysteme" (1990) –Firm: Erwin Halder KG Maschinenfabrik (Germany).

Primary Examiner—Robert C. Watson
Attorney, Agent, or Firm—Herbert Dubno

[57] ABSTRACT

On a base plate with a matrix array of centering holes of a certain unit spacing, an intermediate plate or mounting element can be affixed which has longitudinal rows of centering holes of a center to center spacing which is one-half the unit spacing. A positioning element is mounted on the mounting element and has a pair of parallel positioning surfaces perpendicular to the mounting plane thereof, a countercentering hole located midway between these surfaces and another countercentering hole offset by one-quarter of the unit spacing corresponding to the offset between the holes of the rows of the mounting element whereby, by rotation of the positioning element through 180° in its plane, small changes in the location of the positioning surfaces can be achieved.

9 Claims, 3 Drawing Sheets

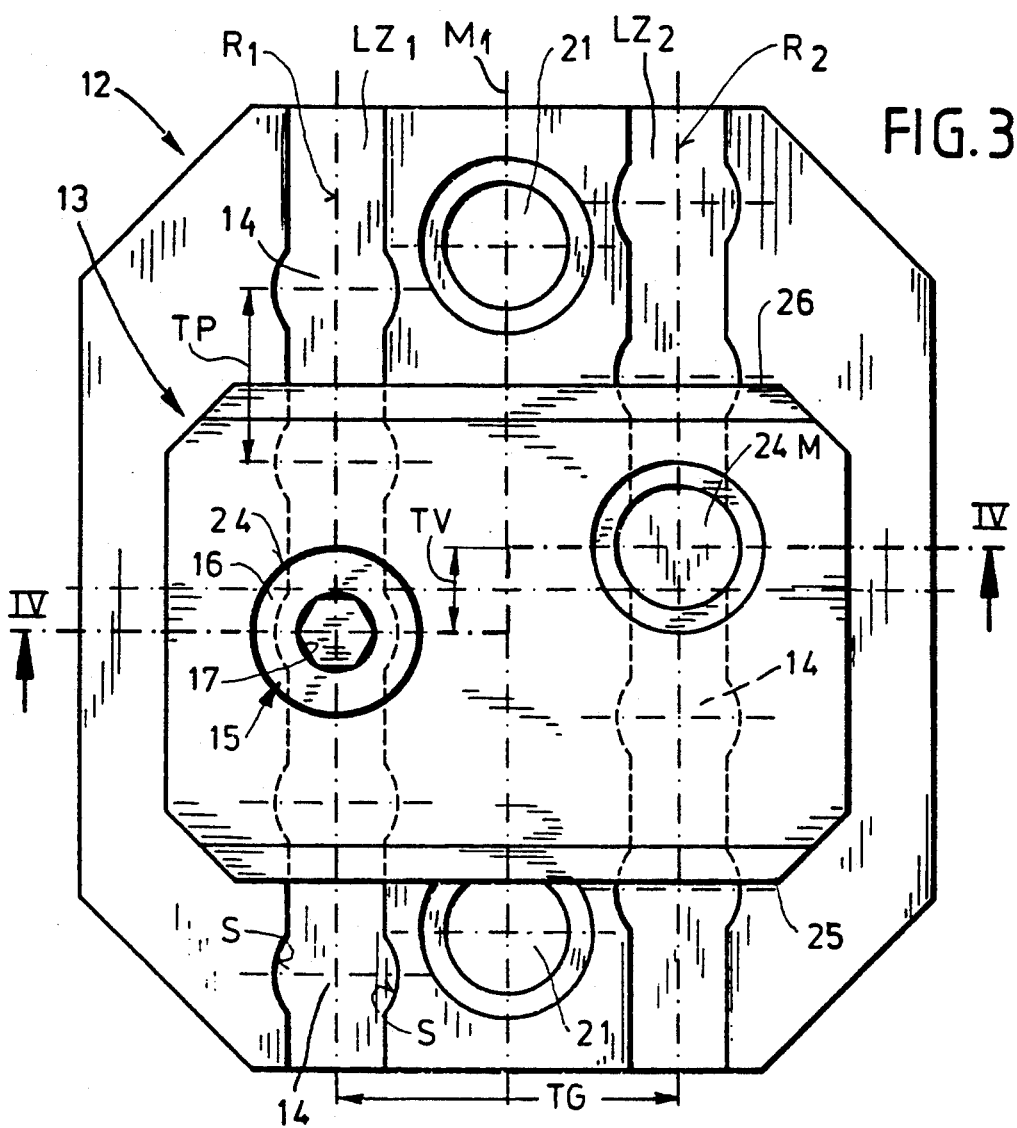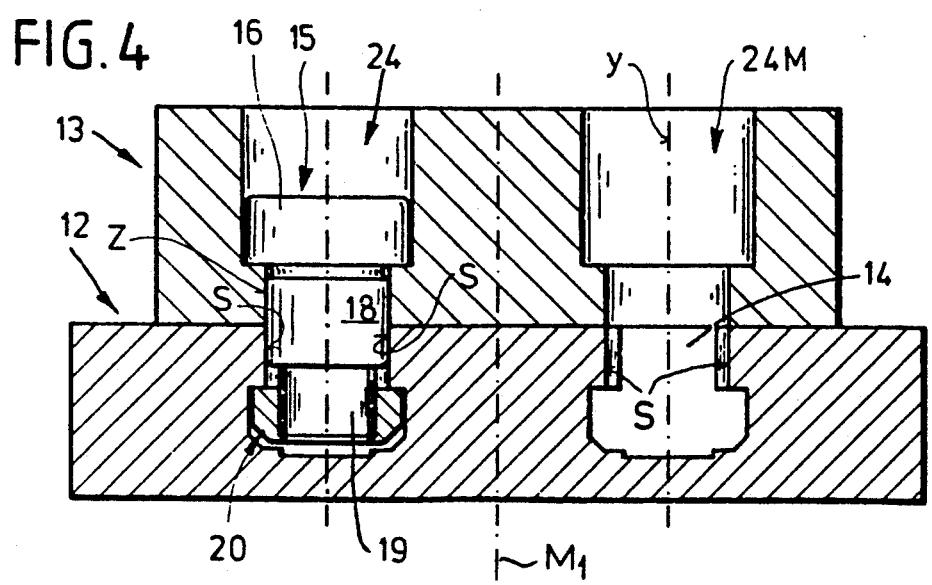

MOUNTING SYSTEM FOR MACHINE TOOLS AND THE LIKE

FIELD OF THE INVENTION

My present invention relates to a mounting system for machine tools and the like or, more generally, for use in the machine tool industry. More specifically the invention relates to a mounting system which allows the elements of the system to form a jig, holder, clamp or the like for laying out, machining, measuring or any combination thereof.

Specifically, the invention deals with a mounting system for the purposes described in which a mounting plate has a matrix array of centering holes upon which a mounting element can be positioned and the mounting element provides a support plane for a workpiece which can be held against or positioned against a stop attached by additional centering means to the mounting element.

BACKGROUND OF THE INVENTION

In general, a mounting system or jig for holding a workpiece in a machine tool application, e.g. to support the workpiece for a machining operation such as drilling, milling, grinding or shaping, for laying out a workpiece at a work bench or on a machine tool, for orienting a workpiece and for holding a workpiece while measurements are made thereon, can comprise a base plate or pallet which can be formed with a matrix array of centering holes upon which a mounting element can be fixed at any selected orientation by means of fasteners engaging in selected ones of the centering holes.

The mounting element, in turn, can support a stop having a surface which lies at a right angle, for example to a support plane formed by the mounting element.

A system of that type is described, for example, in the catalog entitled "norm+technik Vorrichtungssysteme" (1990) from the firm Erwin Halder KG Maschinenfabrik, D-7959 Achstetten-Bronnen, Germany.

The catalog, page 68, shows a base plate provided with such centering holes in a matrix array of longitudinal and transverse rows of such holes with a unit spacing between the holes in each row. The mounting element can be positioned upon this plate as shown in catalog page 77 and can be provided with a connecting or clamping element forming the aforementioned abutment surface as described at page 84 for a prismatic member or at page 85 for a positioning bar. The fasteners used to center the mounting element and the bar or stop on the plate and the mounting element, respectively, are centering bolts or cap screws.

OBJECTS OF THE INVENTION

It is the principal object of the present invention to provide an improved mounting system or jig for use in machine tool applications which has greater versatility than earlier systems, can be used more conveniently and, by comparison with the earlier system, with relatively simple means, can have additional functions.

Another object of this invention is to provide a mounting system of jig for machine tool applications which has a comparatively simple structure, but yet is more versatile than the earlier systems.

Yet a further object of my invention is to provide a relatively low cost mounting or clamping unit which obviates drawbacks of prior art systems.

SUMMARY OF THE INVENTION

These objects and others which will become more readily apparent hereinafter are attained, in accordance with the invention in which the mounting element has at least two rows of centering holes which may be identical to the holes of the underlying base plate or mounting plate so as to enable the same fastener to be used therewith in a centering application, but the holes of the two parallel rows are spaced apart by substantially half the unit spacing of the holes of each longitudinal and transverse row, the holes of one row of the mounting element are offset longitudinally along the row from the holes of the other row and lie substantially midway between them so that the offset is approximately one-quarter of the unit spacing, the stop or positioning member has two mutually parallel positioning surfaces which lie at a right angle to the support plane formed by the mounting element for the workpiece, and one of the openings of one row of the mounting element lies substantially in a median plane between these two surfaces while the opposite centering hole from the other row is offset by one-quarter of the unit distance toward one or the other of the positioning surfaces.

More particularly, the clamping system for machine tools or the like of the invention can comprise:

a mounting plate defining a support plane and formed with mutually parallel longitudinal and transverse spaced-apart rows of centering holes forming a matrix array of the holes with a common unit spacing of the holes along the rows and between the rows;

at least one mounting element on the mounting plate, resting on the support surface and provided with at least a pair of centering fasteners engageable in respective ones of the holes of the mounting plate and centered therein, the mounting element defining a mounting plane for a workpiece and having at least two spaced apart mutually parallel rows of centering holes spaced apart along the respective rows by a uniform spacing of one-half the unit spacing, the centering holes of one of the rows of the mounting element being longitudinally offset from the centering holes of the other of the rows of the mounting element by a distance of one-quarter of the unit spacing; and a positioning element resting upon the mounting plane and having a pair of mutually parallel opposite positioning surfaces substantially perpendicular to the mounting plane, the positioning element being formed with two countercentering holes positioned to register with two directly neighboring centering holes of two of the rows of the mounting element and receiving respective fasteners traversing the countercentering holes of the positioning element and the centering holes of the mounting element registering therewith, one of the countercentering holes having an axis located midway between the positioning surfaces while the other countercentering hole is offset from a plane of the axis midway between the positioning surfaces by one-quarter of the unit spacing toward one of the positioning surfaces.

When the unit spacing is, for example, 50 mm, the mounting element together with the positioning element or stop thereof can only be shifted in 50 mm steps on the base plate or pallet. For the case in which a smaller shift is desirable, the positioning element can be shifted on the mounting element by half the unit spacing, for example, by 25 mm.

If, however, a still smaller step is required for positioning the surface of the stop for a particular workpiece, the stop need only be swung through 180° about the centrum of its large base surface to bring one of the centering fasteners of the positioning element into the opposite centering bore or hole from that which accommodated the corresponding fastener, the centrally located hole of the positioning element, thereby shifting the positioning surface, again by half the smaller distance, i.e. by say 12.5 mm. At any location, by a combination of the swinging movement of the positioning element, by reason of the offset of the fasteners thereof and by reason of the offset of the hole of the two hole rows of the mounting element, I can locate a positioning or stop surface in increments of 12.5 mm anywhere on the base plate, notwithstanding the fact that the unit spacing on the base plate of the centering openings is 50 mm.

It will be apparent, therefore, that with extremely simple means it is possible to subdivide the matrix array of holes into spacings of 25 mm and 12.5 mm from the original 50 mm. With such simple means, therefore, a very fine raster of positions of the stop on the perforated plate can be ensured.

In the past, a very fine spacing for increment of the spacing of a mounting or positioning device could only be obtained with relatively complex jigs, generally created for special purposes and with a relatively large fabrication cost. For example, in German patent document DE 38 02 987 C1, a mounting element is described which can be fabricated only at quite considerable expense and which is intended to provide a fine step in the relative spacing of parts.

Also for special purposes, German patent document DE 40 34 340 A1 describes a special fine structure utilizing grooves and slide members shiftable along these groves and engageable with undercuts thereof.

According to a feature of the invention, the right angle distance between the longitudinal axis of the centrally located centering hole of the positioning member from one of the two positioning surfaces is a multiple of one-quarter of the unit spacing of the holes of the base plate or mounting plate. Under these conditions, one or another of the mutually parallel positioning surfaces is always in a raster-correct position.

According to another feature of the invention, each hole of the longitudinally-extending rows of holes of the mounting element forms an integrated component of a T-shaped undercut clamping groove which can be of the type described in German patent document DE 40 38 969. An integrated groove-hole raster can form the clamping grooves and can be employed in accordance with the invention, although special groove sliders of the type required by German patent document DE 40 34 340 is not necessary to provide the fine raster steps of the invention.

BRIEF DESCRIPTION OF THE DRAWING

The above and other objects, features and advantages of the present invention will become more readily apparent from the following description, reference being made to the accompanying drawing in which:

FIG. 3 is a plan view only of the mounting element and the positioning element secured thereto but with the positioning element swung through 180° relative to its position in FIG. 1; and FIG. 4 is a vertical section taken along line IV—IV of FIG. 3.

SPECIFIC DESCRIPTION

Figure 1:
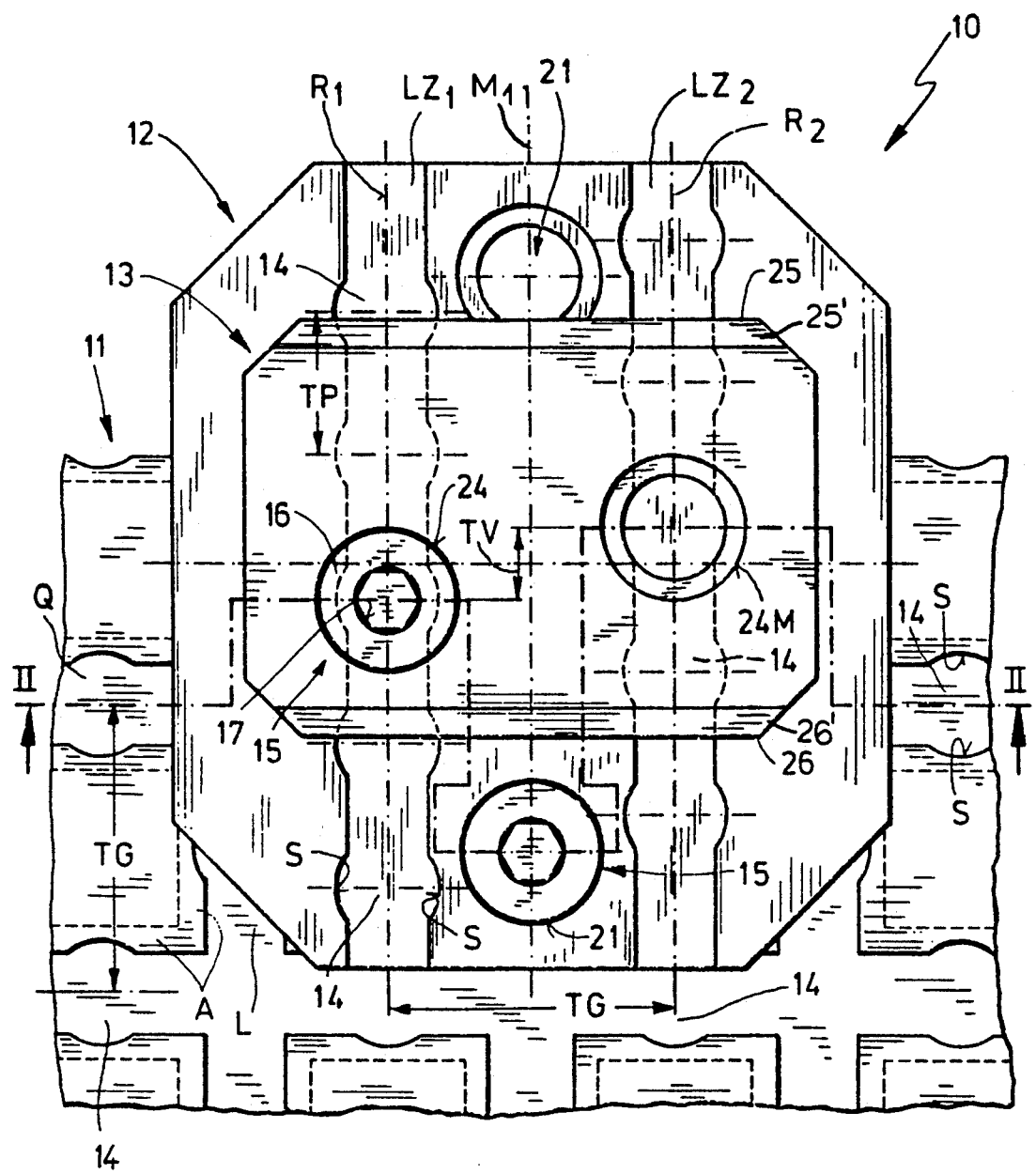
FIG. 1 is a partial illustration of a mounting or base plate according to the invention, seen in plan view, together with a mounting element position thereof and an abutment plate mounted on the mounting element.
Figure 2:
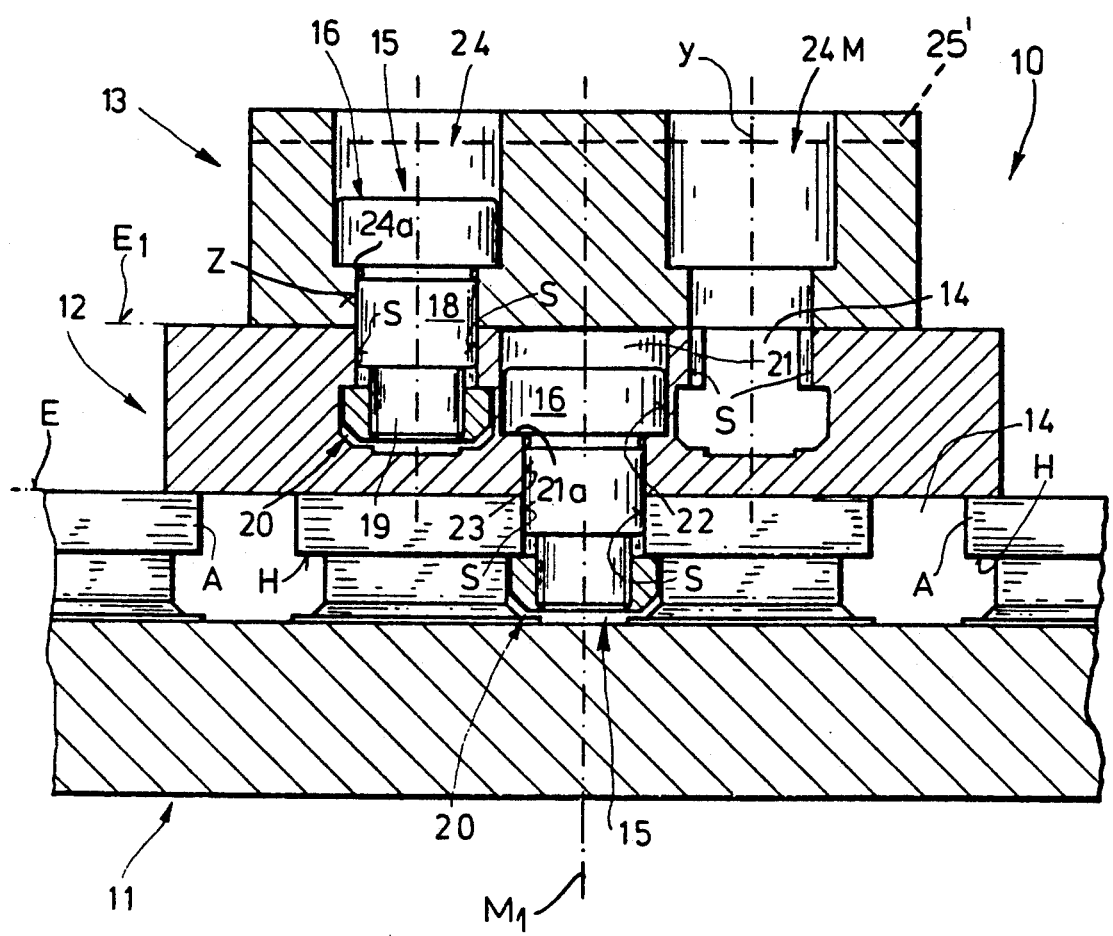
FIG. 2 is a vertical section taken along line II—II of FIG.

The mounting system or jig for machine-tool application shown in FIGS. 1 and 2 is intended to be used as the system described in the aforementioned brochure as a bench-top jig for holding a workpiece for measurement or layout, as a clamping system for holding a workpiece for a machining operation, e.g. drilling, milling, shaping or grinding, or for any other purpose including the transfer of workpieces between machine tools. While reference will be made to mounting planes and surfaces upon which a workpiece can rest, and positioning surfaces which are provided to orient, align or locate a workpiece for a particular operation, it will be understood that a variety of clamping devices, including step clamps, studs, T-nuts and the like can also be used as is conventional with jigs or clamping systems for similar purposes.

The mounting system 10 shown in FIGS. 1 and 2 comprises basically a base plate or pallet 11 which has only partially been illustrated in FIG. 1, a connecting mounting or clamping element in the form of an intermediate plate 12 and a positioning element in the form of an abutment or stop plate 13.

It will be understood that the plate 12 can represent one of a plurality of such plates provided on the common base plate 11, that the positioning element 13 can represent one of a plurality of positioning elements provided on respective intermediate plates 12 and that the clamping devices which may be used in conjunction with this system can be provided on similar intermediate plates 12 or conventional intermediate plates of the type shown in the brochure depending upon the need of the circumstance.

The pallet or base plate 11 is provided with longitudinal clamping grooves L and transverse clamping grooves Q in mutually orthogonal arrays, each of a T-section with undercuts H beneath which the flanges of flanged nuts or the heads of T-nuts can engage.

The undercut regions H are defined at their tops by edge regions A which are formed with right circular cylindrical centering bores or holes 14 which, as can be seen from FIG. 2, reach to the region below the undercuts H. These centering holes 14 are each defined by two shell-shaped guide surfaces S which cooperate with the right circular cylindrical portions of respective fasteners as can be seen for the centering fastener or element 15 in FIG. 2. The surfaces S, therefore, are segments of right cylindrical inner surfaces of identical radii.

The intermediate plate 12 is formed with longitudinal grooves provided with centering bores 14 identical in shape to the centering bores 14 of the pallet 11 and of the same size to cooperate with the same fasteners and the same nuts.

The centering bores or holes 14 receive the centering elements or fasteners 15 as mentioned.

Each centering element or fastener 15 has a cylindrical head 16 with an inner hexagonal socket 17 for receiving a corresponding key such as an Allen wrench. The head 16 is of a first diameter dimensioned such that the head can engage against a shoulder 24a or a shoulder 21a of respective stepped bores to be described.

The centering elements or fasteners 15 also have, along their respective axes, smooth-surfaced centering shafts or shanks 18 of a second diameter less than that of the heads 16 and with a right circular cylindrical outer surface Z which can correspond with fit tolerance to the radius of curvature of the surfaces S.

At the free end of each fastener 15 is a threaded shank 19 of a diameter smaller than the diameter of the shank 18. The threaded shank 19 is engageable with a nut 20 which can slide in the respective groove and has a shape conforming thereto so that it is held against rotation in the groove L or Q, or the longitudinal grooves of the intermediate plate 12. The grooves 20, upon tightening of the fasteners, are braced against the undersides of the undercut regions H. The cylindrical surfaces Z engage with relatively small tolerance, e.g. H6g6 the surfaces S and are thus centered thereby.

To affix the intermediate plate 12 to the pallet or base plate 11, the fasteners 15 can fit into centering bores 21 of stepped diameter provided along a vertical median plane M1 of the intermediate plate 12. The stepped bores 21 have relatively large diameter regions 22 to accommodate the heads 16 and narrower regions 23 forming clearance bores passing the centering shanks 18 with the relatively narrow clearance H6g6 as described, thereby centering the intermediate plates 12 with respect to the holes 14 in the base plate or pallet 11.

From FIGS. 1 and 2 it can also be seen that the spacing between the cylindrical centering bores 21, one of which is shown in FIG. 1 to have a centering element or fastener 15 therein while the other is devoid of the fastener, register precisely with two corresponding centering bores of the pallet 11. The center to center spacing of the two centering bores 21 for the intermediate plate 12 in FIGS. 1 and 3 amounts to 100 mm or twice the center to center spacing of the bores of the base plate 11, i.e. the unit spacing of the matrix array or raster of these bores. In general, the spacing between the bores 21 should be nU where n is an integer 1, 2 . . . and U represents the unit spacing shown at TG in FIG. 1. In this manner, a very precise centering of the intermediate plate 12 with respect to the centering bores 14 of the matrix array of the base plate 11 is ensured.

The support plane of the base plate 11 is represented at E and the intermediate plate 12 provides a mounting plane E1 on which a workpiece can rest.

Every four neighboring centering bores 14 of the pallet or mounting plate 11 have their centers lying at the corners of a square with an edge length of 50 mm, the matrix array unit distance or spacing TG amount to 50 mm.

The intermediate plate 12 also has a basically rectangular shape and is provided with two longitudinal grooves LZ1 and LZ2. The centering bores 14 of the longitudinal grooves LZ1 and LZ2 form two mutually parallel transversely spaced rows of holes which are represented as the hole rows R1 and R2 respectively.

By contrast with the unit spacing TG of the pallet 11 of 50 mm, the center to center spacing TP of the holes of rows R1 and R2 is one-half the unit spacing, i.e. 25 mm. Furthermore, the holes of the two rows are offset relative to one another by one-quarter of the unit spacing TG, i.e. 12.5 mm as represented by the dimension TV in FIG. 1.

The axes of the rows R1 and R2 can be spaced by the full unit spacing TG and the perpendicular distance between plane M1 and the planes of the axes of these rows can be the half unit spacing TP.

The abutment plate 13 has two countercentering holes 24, 24M which are dimensionally identical to the centering bores 21 of the intermediate plate 12. The countercentering bores 24, 24M also, therefore, can receive the identical centering elements 15 which cooperate with the nuts 20 slidable in the grooves and of which only one has been shown in FIG. 2 and in FIG. 4 of the drawing. Only one centering element 15 has been shown in place in one of the countercentering holes 24, 24M.

The countercentering holes 24, 24M are offset by the identical dimension TV of 12.5 mm as described for the centering bores 14 of the rows R1 and R2 of the intermediate plate 12.

The abutment plate 13 is formed with two planar positioning surfaces 25 and 26 below respective bevels 25', 26' and perpendicular to the planes E, E' for positioning a workpiece which is clamped thereagainst.

The mutually parallel surfaces 26 are spaced apart by mU/4, i.e. an integral number of quarter unit spacing TV, m being an integer. The countercentering bore 24M has its axis y located precisely centrally between two positioning surfaces 25, 26.

As a result of this relationship, upon rotation of the abutment plate 13 in the mounting plane E1 through 180° from the position shown in FIG. 1 to its position shown in FIG. 3, a relatively fine raster step adjustment of the positioning surfaces 25, 26 by the amount of the quarter spacing 12.5 mm can result. The surface 26 which was in the lower position in FIG. 1 now assumes the upper position in FIG. 3 and vice versa, the positions in FIG. 1 being set upwardly by 12.5 mm by comparison with the positions of FIG. 3.

The entire assembly thus allows the following positioning modes:

For the case in which a shift in position of the surfaces 25, 26 for the workpiece by 50 mm is desired, the intermediate plate 12 with the abutment plate 13 clamped thereto is moved by the unit spacing of 50 mm parallel to the longitudinal rows L or transversely, parallel to the transverse rows G or both.

For the case in which a positioning of the surfaces 25, 26 requires a half unit movement of 25 mm, the abutment plate 13 can be shifted by the half unit spacing TP of 25 mm relative to the intermediate plate 12 without rotating the abutment plate 13 in its plane. When, however, a shift of 12.5 mm is required, the abutment plate 13 can be rotated through 180° in its plane to effect a repositioning of the surfaces 25, 26 by the quarter unit spacing TV of 12.5 mm.

As a consequence of the conditions set forth above, each of the surfaces 25 and 26 can be an integral number of quarter unit spacings from the axis y of the countercentering bore 25. From the drawing it is also apparent that for connecting and positioning the elements 11–13, identical centering elements 15 and nuts 20 are provided.

I claim:

1. A mounting system for machine-tool applications, comprising:
   a mounting plate defining a support plane and formed with mutually parallel longitudinal and transverse spaced-apart rows of centering holes forming a matrix array of said holes with a common unit spacing of the holes along said rows and between said rows;
   at least one mounting element on said mounting plate, resting on said support surface and provided with at least a pair of centering fasteners engageable in respective ones of said holes of said mounting plate and centered therein, said mounting element defining a mounting plane for a workpiece and having at least two spaced apart mutually parallel rows of centering holes spaced apart along the respective rows by a uniform spacing of one-half said unit spacing, the centering holes of one of said rows of said mounting element being longitudinally offset from the centering holes of the other of said rows of said mounting element by a distance of one-quarter of said unit spacing; and a positioning element resting upon said mounting plate and having a pair of mutually parallel opposite positioning surfaces substantially perpendicular to said mounting plane, said positioning element being formed with two countercentering holes positioned to register with two directly neighboring centering holes of two of said rows of said mounting element and receiving respective fasteners traversing the countercentering holes of said positioning element and the centering holes of the mounting element registering therewith, one of said countercentering holes having an axis located midway between said positioning surfaces while the other countercentering hole is offset from a plane of said axis midway between said positioning surfaces by one-quarter of said unit spacing toward one of said positioning surfaces.

2. The mounting system defined in claim 1 wherein the perpendicular distance from one of said positioning surfaces to the plane of said axis is a multiple of one-quarter of said unit spacing.

3. The mounting system defined in claim 1 wherein each of said rows of said mounting element is an integral part of a undercut clamping groove.

4. The mounting system defined in claim 3 wherein said undercut clamping grooves are of T-shaped cross section.

5. The mounting system defined in claim 4 wherein the perpendicular distance from one of said positioning surfaces to the plane of said axis is a multiple of one-quarter of said unit spacing.

6. The mounting system defined in claim 5 wherein each of said rows of said mounting plate is an integral part of a undercut clamping groove of T-shaped cross section.

7. The mounting system defined in claim 6 wherein each of said fasteners is a cap screw having a cylindrical head of a first diameter adapted to seat against a shoulder of a respectively one of said holes receiving the respective cap screw, a cylindrical centering shank of a second diameter smaller than said first diameter, and a threaded end of a diameter less than said second diameter and engageable in a nut received in a respective one of said grooves and drawn against an undercut thereof.

8. The mounting system defined in claim 7 wherein said heads are formed with polygonal sockets for receiving a respective key.

9. The mounting system defined in claim 8 wherein said unit spacing is substantially 50 mm.

* * * * *